United States Patent
Shraer et al.

(10) Patent No.: US 11,556,561 B2
(45) Date of Patent: Jan. 17, 2023

(54) DISTRIBUTED DATABASE CONFIGURATION

(71) Applicant: Google LLC, Mountain View, CA (US)

(72) Inventors: Alexander Shraer, Stanford, CA (US); Artyom Sharov, Haifa (IL); Arif Abdulhusein Merchant, Los Altos, CA (US); Brian F. Cooper, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/074,578

(22) Filed: Oct. 19, 2020

(65) Prior Publication Data

US 2021/0034641 A1    Feb. 4, 2021

Related U.S. Application Data

(63) Continuation of application No. 15/200,939, filed on Jul. 1, 2016, now Pat. No. 10,831,777.

(60) Provisional application No. 62/188,076, filed on Jul. 2, 2015.

(51) Int. Cl.
| | | |
|---|---|---|
| *G06F 16/27* | (2019.01) | |
| *G06F 16/25* | (2019.01) | |
| *H04L 67/1025* | (2022.01) | |
| *H04L 67/1097* | (2022.01) | |
| *G06F 16/955* | (2019.01) | |
| *H04L 67/52* | (2022.01) | |
| *H04L 67/1023* | (2022.01) | |

(52) U.S. Cl.
CPC .............. *G06F 16/27* (2019.01); *G06F 16/25* (2019.01); *G06F 16/955* (2019.01); *H04L 67/1023* (2013.01); *H04L 67/1025* (2013.01); *H04L 67/1097* (2013.01); *H04L 67/52* (2022.05)

(58) Field of Classification Search
CPC ......... G06F 16/27; G06F 16/955; G06F 16/25
See application file for complete search history.

(56) References Cited

U.S. PATENT DOCUMENTS

| | | |
|---|---|---|
| 5,710,915 A | 1/1998 | McElhiney |
| 6,122,264 A | 9/2000 | Kaufman et al. |
| 6,324,654 B1 | 11/2001 | Wahl et al. |
| 6,401,120 B1 | 6/2002 | Gamache et al. |

(Continued)

OTHER PUBLICATIONS

Ardekani et al., "A Self-Configurable Geo-Replicated Cloud Storage System," Proceedings of the 11th USENIX Symposium on Operating Systems Design and Implementation, Oct. 6, 2014, Retrieved from the Internet: URL: https://www.usenix.org/system/files/conference/osdi14/osdi14- paper-ardekani.pdf [retrieved on Sep. 21, 2016].

(Continued)

*Primary Examiner* — Kannan Shan Mugasundaram
(74) *Attorney, Agent, or Firm* — Honigman LLP; Brett A. Krueger

(57) ABSTRACT

Replicas are selected in a large distributed network, and the roles for these replicas are identified. In one example, a leader is selected from among candidate computing clusters. To make this selection, an activity monitor predicts or monitors the workload of one or more clients. Different activities of the workload are given corresponding weights. The delay in performing requested activities, modified by these weights is found, and the candidate leader with the lowest weighted delay is selected as the leader.

18 Claims, 16 Drawing Sheets

(56) References Cited

U.S. PATENT DOCUMENTS

| | | | |
|---|---|---|---|
| 6,591,272 B1* | 7/2003 | Williams | G06F 16/289 707/999.1 |
| 7,478,263 B1 | 1/2009 | Kownacki et al. | |
| 7,555,516 B2 | 6/2009 | Lamport | |
| 7,558,883 B1 | 7/2009 | Lamport | |
| 7,698,465 B2 | 4/2010 | Lamport | |
| 7,797,457 B2 | 9/2010 | Lamport | |
| 7,840,662 B1 | 11/2010 | Natanzon | |
| 7,987,152 B1 | 7/2011 | Gadir | |
| 8,005,888 B2 | 8/2011 | Lamport | |
| 8,126,848 B2 | 2/2012 | Wagner | |
| 8,380,846 B1* | 2/2013 | Abu-Ghazaleh | G06F 15/16 709/224 |
| 8,392,482 B1 | 3/2013 | McAlister et al. | |
| 8,694,647 B2 | 4/2014 | Bolosky et al. | |
| 8,843,441 B1 | 9/2014 | Rath et al. | |
| 9,230,000 B1 | 1/2016 | Hsieh et al. | |
| 9,294,558 B1 | 3/2016 | Vincent et al. | |
| 9,740,472 B1 | 8/2017 | Sohi et al. | |
| 9,971,785 B1 | 5/2018 | Byrne et al. | |
| 2002/0032883 A1 | 3/2002 | Kampe et al. | |
| 2002/0107934 A1 | 8/2002 | Lowery et al. | |
| 2002/0143798 A1 | 10/2002 | Lisiecki et al. | |
| 2004/0143607 A1 | 7/2004 | Beck | |
| 2004/0210673 A1 | 10/2004 | Cruciani et al. | |
| 2004/0249904 A1 | 12/2004 | Moore et al. | |
| 2004/0254984 A1 | 12/2004 | Dinker | |
| 2005/0132154 A1 | 6/2005 | Rao et al. | |
| 2005/0256824 A1 | 11/2005 | Vingralek | |
| 2007/0022122 A1 | 1/2007 | Bahar et al. | |
| 2009/0063356 A1 | 3/2009 | Heise et al. | |
| 2009/0089365 A1* | 4/2009 | Serghi | H04L 67/1023 709/223 |
| 2010/0017495 A1 | 1/2010 | Lamport | |
| 2010/0017644 A1 | 1/2010 | Butterworth | |
| 2010/0131545 A1 | 5/2010 | Srivastava et al. | |
| 2011/0178984 A1 | 7/2011 | Talius et al. | |
| 2011/0178985 A1 | 7/2011 | San Martin Arribas et al. | |
| 2012/0011398 A1 | 1/2012 | Eckhardt et al. | |
| 2012/0078848 A1 | 3/2012 | Jennas, II et al. | |
| 2012/0166390 A1 | 6/2012 | Merriman et al. | |
| 2012/0239722 A1 | 9/2012 | Bolosky et al. | |
| 2012/0254175 A1 | 10/2012 | Horowitz et al. | |
| 2012/0254342 A1 | 10/2012 | Evans | |
| 2012/0271795 A1 | 10/2012 | Rao et al. | |
| 2013/0006687 A1 | 1/2013 | Knapp | |
| 2013/0031048 A1 | 1/2013 | Asai et al. | |
| 2013/0290249 A1 | 10/2013 | Merriman et al. | |
| 2013/0311441 A1 | 11/2013 | Erdogan et al. | |
| 2014/0095505 A1* | 4/2014 | Blanchflower | G06F 16/182 707/737 |
| 2014/0101100 A1 | 4/2014 | Hu et al. | |
| 2014/0164329 A1 | 6/2014 | Guo et al. | |
| 2014/0164831 A1 | 6/2014 | Merriman et al. | |
| 2014/0223135 A1 | 8/2014 | Parham et al. | |
| 2014/0344331 A1 | 11/2014 | Johns et al. | |
| 2015/0058306 A1 | 2/2015 | Earl et al. | |
| 2015/0161016 A1 | 6/2015 | Bulkowski et al. | |
| 2015/0254325 A1* | 9/2015 | Stringham | G06F 16/278 707/737 |
| 2015/0363124 A1 | 12/2015 | Rath et al. | |
| 2016/0034555 A1 | 2/2016 | Rahut et al. | |
| 2016/0036924 A1 | 2/2016 | Koppolu et al. | |
| 2016/0077936 A1 | 3/2016 | Tang et al. | |
| 2016/0094356 A1 | 3/2016 | Xiang et al. | |
| 2016/0366220 A1 | 12/2016 | Gottlieb et al. | |
| 2017/0004193 A1 | 1/2017 | Shraer et al. | |
| 2017/0006105 A1 | 1/2017 | Shraer et al. | |
| 2017/0083410 A1 | 3/2017 | Anglin et al. | |
| 2017/0154091 A1 | 6/2017 | Vig et al. | |
| 2017/0264493 A1 | 9/2017 | Cencini et al. | |
| 2017/0329798 A1 | 11/2017 | Srivas et al. | |
| 2018/0027048 A1 | 1/2018 | Zhang | |

OTHER PUBLICATIONS

Becker et al., "Leader Election for Replicated Services Using Application Scores," Correct System Design [Lecture Notes in Computer Science; Lect.Notes Computer], Springer International Publishing, Cham, Dec. 12, 2011, pp. 289-308.

Ejaz et al., "Improving Wide-Area Replication Performance through Informed Leader Election and Overlay Construction," 2013 IEEE Sixth International Conference on Cloud Computing, IEEE, Jun. 28, 2013, pp. 422-429.

International Search Report and Written Opinion in International Application No. PCT/US2016/040741, dated Oct. 13, 2016, 16 pages.

Santos et al., "Latency-aware leader election," Applied Computing, Mar. 8, 2009, pp. 1056-1061.

Baker et al., "Megastore: Providing Scalable, Highly Available Storage for Interactive Services," 5th Biennial Conference on Innovative Data Systems Research (CIDR '11), Jan. 9-12, 2011, pp. 223-234.

Cooper et al., "PNUTS: Yahoo!1 s Hosted Data Serving Platform," Proceedings of the VLDB Endowment, 1 (2): 1277-1288, Aug. 2008.

Kadambi et al., "Where in the World is My Data?" Proceedings of the VLDB Endowment, 4(11):1040-1050, Sep. 2011.

Sharov et al., "Optimizing Spanner Replica Roles," Research Reports, Sep. 2014, 1 page.

Wolfson et al., "An Adaptive Data Replication Algorithm," ACM Transactions on Database Systems (TODS), 22 (2):255-314, Jun. 1997.

* cited by examiner

| | Process 1 | Process 2 | Process 3 | Process 4 | | Weight1 | Weight2 | Weight3 |
|---|---|---|---|---|---|---|---|---|
| Node$_{106}$ | 28 | 68 | 78 | 62 | | 236.0 | 241.8 | 276.81 |
| Node$_{102}$ | 87 | 13 | 49 | 45 | | 194.0 | 184.4 | 82.2 |
| Node$_{112}$ | 41 | 27 | 29 | 19 | | 101.0 | 75.4 | 74.1 |
| Node$_{116}$ | 54 | 77 | 23 | 36 | | 190.0 | 145.3 | 133.4 |
| Node$_{108}$ | 46 | 19 | 10 | 20 | | 95.0 | 75.6 | 63.3 |
| Node$_{116}$ | 41 | 37 | 93 | 13 | | 184.0 | 177.0 | 214.0 |
| Node$_{114}$ | 11 | 01 | 36 | 21 | | 69.0 | 86.3 | 105.5 |
| Node$_{110}$ | 66 | 11 | 76 | 59 | | 212.0 | 230.6 | 254.6 |
| Sample1 | 1 | 1 | 1 | 1 |
| Sample2 | 0.5 | 0.4 | 1.3 | 1.6 |
| Sample3 | 0.1 | 0.3 | 1.9 | 1.7 |

FIG. 2

$$550 \quad X_{ab}^{(i)} = \arg\min_{c \in V(ab)} \left( \text{score}^{(i)}(c) \right),$$

$$551 \quad \text{score}^{(i)}(c) = \sum_{a,c} t_{a,c}^{(i)}(\ell) \cdot n_{a,c}^{(i)}$$

$$552 \quad Pr(t_{threaded\_read,c}^{(i)}(\ell) = x) =$$

$$Pr(rtt_{c,nearest(c,R)} + rtt_{nearest(c,R),c} = x) =$$

$$= \sum_{h=1}^{x} Pr(rtt_{c,nearest(c,R)} = h, rtt_{nearest(c,R),c} = x - h) =$$

$$= \sum_{h=1}^{x} Pr(rtt_{c,nearest(c,R)} = h) \cdot Pr(rtt_{nearest(c,R),c} = x - h),$$

$$554 \quad Pr(\max(rtt_{c,v}, rtt_{c,w}) \le x) = Pr(rtt_{c,v} \le x, rtt_{c,w} \le x)$$
$$= Pr(rtt_{c,v} \le x) \cdot Pr(rtt_{c,w} \le x)$$

$$556 \quad Pr(q_c^{(i)} < x) = Pr(rtt_{c,v} \le x) + Pr(rtt_{c,w} \le x)$$
$$- Pr(\max(rtt_{c,v}, rtt_{c,w}) \le x)$$

FIG. 5B

1: // $L_{fixed}$: set of fixed replica locations, which can't be moved
2: // num_replicas: total number of replicas to be placed
3: procedure weighted-k-means($L_{fixed}$, num_replicas)
4:     // pick initial centroids
5:     $C \leftarrow L_{fixed}$
6:     sort all client clusters $c \in C$ by descending $w_c$
7:     while $|C| <$ num_replicas and more client clusters remain
8:         $c \leftarrow$ next client cluster in $C$
9:         if nearest($c, S$) $\notin C$ then
10:            add nearest($c, S$) to $C$
11:        next_cost $\leftarrow$ cost($C$)
12:    repeat
13:        prev_cost $\leftarrow$ next_cost
14:        // cluster clients according to nearest centroid
15:        $\forall g \in C$ let $C_g \leftarrow \{c \mid g =$ nearest$(c, C)\}$
16:        // attempts to adjust centroids
17:        for each $g \in G \setminus L_{fixed}$
18:            $g' \leftarrow v \in S$ s.t. $\sum_{c \in C_g} w_c \cdot \text{rtt}_{c,v}(s)$ is minimized
19:            update centroid $g$ to $g'$
20:        next_cost $\leftarrow$ cost($C$)
21:    until next_cost − prev_cost < threshold
22:    return $C$

850

FIG. 8B $$w_c = n^{(i)}_{a,c} = n^{(i)}_{weak\ read,c} + n^{(i)}_{bounded\ read,c} + n^{(i)}_{strong\ read,c}$$
$$+ n^{(i)}_{single\text{-}group\ transaction,c} + n^{(i)}_{multi\text{-}group\ transaction,c}$$

900

$$cost(G) = \sum_{c \in W} w_c \cdot rtt^{(i)}_{c,transact(c,G)}$$

```
1: procedure KMeans-Quorum(num_replicas, num_voters)
2:   G ← weighted-k-means(0, num_replicas)              800
3:   (A, V) ← tier-k-efficient(G, num_voters)            500
4:   // Return the leader, set of voters and set of replicas
5:   return (A, V, G)
```

```
1: procedure Quorum-KMeans(num_replicas, num_voters)
2:     majority ← ⌈(num_voters+1)/2⌉
3:     minority ← num_voters − majority
4:     for each replica ℓ ∈ S
5:         q_ℓ^(v) ← majority-th smallest rtt_{ℓ,s}^(v), s ∈ S
6:         Q_ℓ ← k-closest(ℓ, majority, q_ℓ^(v), S)
7:         C_ℓ ← weighted-k-means(Q_ℓ, num_replicas)
8:         score_ℓ ← agg_score^(v)(ℓ, C_ℓ, q_ℓ^(v))  (Equation 2)
9:     λ = arg min_{ℓ ∈ S} {score_ℓ}
10:    O ← any minority locations from G_A \ Q_A
11:    // Return the leader, set of voters and set of replicas
12:    return (λ, Q_A ∪ O, G_A)
```

FIG. 11B

DISTRIBUTED DATABASE CONFIGURATION

CROSS-REFERENCE TO RELATED APPLICATION

This U.S. patent application is a continuation of, and claims priority under 35 U.S.C. § 120 from, U.S. patent application Ser. No. 15/200,939, filed on Jul. 1, 2016, which claims priority under 35 U.S.C. § 119(e) to U.S. Provisional Application 62/188,076, filed on Jul. 2, 2015. The disclosures of these prior applications are considered part of the disclosure of this application and are hereby incorporated by reference in their entireties.

TECHNICAL FIELD

The present document relates to configuration of distributed computer databases.

BACKGROUND

A computer network is a collection of computers and other hardware interconnected by communication channels that allow sharing of resources and information. Communication protocols define the rules and data formats for exchanging information in a computer network.

A distributed database is a computing entity that holds data across a number of computers. These computers can be interlinked with computer networking links, allowing the computers to communicate with each other and coordinate the tasks associated with the database. In some distributed databases, the constituent computers can be organized into computing clusters and assigned to respective roles in the distributed database. These roles may, for example, describe some of the permissions and activities of the cluster in the distributed database.

SUMMARY

The systems and processes described here may be used to optionally provide a number of potential advantages. By monitoring the activity of clients and the computing environment, roles for a distributed database can be efficiently assigned. This efficiency may be greater than alternative methods such as user selection and heuristics using only information local to a particular node of the system. By selecting a leader first, and then selecting other roles based on the leader selection, the number of combinations of role assignments can be drastically reduced compared to other processes that do not select the leader first. This results in an improvement in the technological field of distributed databases.

In general, one innovative aspect of the subject matter described in this specification can be embodied in systems that include a plurality of computing clusters each comprising computer memory and a computer processor; a distributed database running on at least a subset of the plurality of the computing clusters and that interacts with a client application running on a client computer, the distributed database configured to: store data of the distributed database in shards distributed among computing clusters of the distributed database; and use each computing cluster of the computing clusters of the distributed database according to a respective role assigned to the computing cluster that identifies functions of the computing cluster; an activity monitor service configured to: monitor interactions between the client application and the distributed database; and generate, from the monitoring of the interactions between the client application and the distributed database, workload data describing the interactions between the client application and the distributed database; and a task assigning service configured to: assign, based on the workload data, a particular computing cluster to a leader role in the distributed database. Other embodiments of this aspect include corresponding methods, apparatus, and computer programs, configured to perform the action of the methods, encoded on computer storage devices.

These and other embodiments can each optionally include one or more of the following features. To assign, based on the workload data, a particular computing cluster to a leader role in the distributed database, the task assigning service is configured to: find the cluster having a lowest latency for completing processes identified in the workload data.

To find the cluster having the lowest latency for completing processes identified in the workload data, the task assigning service is configured to: identify a frequency for each process; identify a latency value for each process for each computing cluster; and find, for each computing cluster, a weighted latency value that incorporates a aggregation of the latency values for the cluster, wherein the latency values in the aggregation of the latency values have been weighted according to the frequency of the corresponding processes.

The activity monitor is configured to repeat the monitoring and the generating and wherein the task assigning service is configured to repeat the assigning.

To repeating the assigning, the task assigning service is configured to assign, based on the workload data, a different particular computing cluster to the leader role in the distributed database.

The activity monitor is configured to repeat the monitoring and the generating and wherein the task assigning service is configured to repeat the assigning on a schedule that is based on cyclical changes in usage of the computing clusters.

The activity monitor service and the task assigning service are running on one or more of the computing clusters.

The client computer is one of the computing clusters.

Other features, aspects and potential advantages will be apparent from the accompanying description and figures.

DESCRIPTION OF DRAWINGS

FIG. 2 is spreadsheet of example calculations used to determine communication delays.

FIG. 5B shows equations that can be used in selecting computing clusters for replica and voting rotes within a distributed database.

FIG. 8B is an example of pseudocode that may be used to implement the operations shown in FIG. 8A.

FIG. 9 are example formulas in the process shown in FIG. 8B.

FIG. 10B is an example of pseudocode that may be used to implement the operations shown in FIG. 10A.

FIG. 11B is an example of pseudocode that may be used to implement the operations shown in FIG. 11A.

Like reference symbols in the various drawings indicate like elements

DETAILED DESCRIPTION

Figure 1:
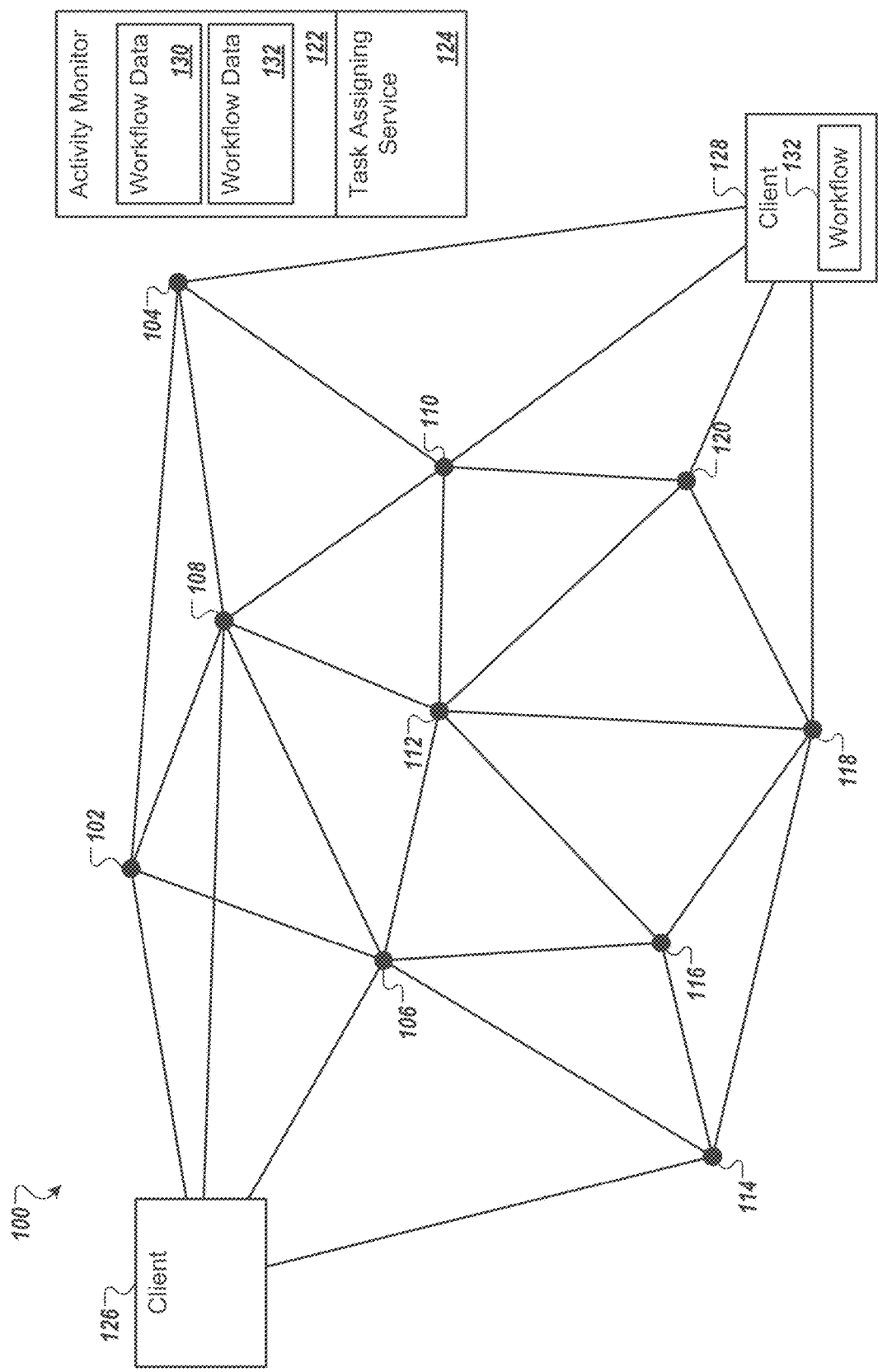
FIG. 1 is block diagram of an example distributed computing environment that can be used to support distributed databases.

Distributed storage systems are widely used in the cloud, both within data centers as well as for replication across data centers. Many distributed databases assign roles to the computers that constitute the database. On such example is the Paxos protocol, in which the distributed database uses nodes in the system as "replicas" which replicate some or all of the distributed database. Additionally, the distributed database can use some or all of the nodes according to respective roles defined by the Paxos protocol that identify functions of the nodes. These roles include "client," "proposer," "voter," "learner," and "leader" roles. Clients can interact with the distributed database by issuing requests to a proposer of the distributed database. Proposers can propose an action in the distributed database, for example an update or query of the stored data. The voters (sometimes called acceptors) can accept or deny the proposed actions from the proposers. If a quorum of voters accept a proposal, the distributed database should complete the proposed action. Quorums may be a simple majority of voters or may require a different number of voters, depending on the configuration of the distributed database. Learners act on actions that have been approved by a quorum of the voters. The leader is a proposer, and in many cases, the only proposer that is able to successfully propose actions that will be accepted by a quorum of voters.

This document discusses the selection of replicas in a large distributed network, and the selection of roles for these replicas. In one example, a leader is selected from among candidate computing clusters (or servers, datacenters, etc.). To make this selection, an activity monitor predicts or monitors the workload of one or more clients. Different activities of the workload are given corresponding weights. The delay in performing requested activities, modified by these weights is found, and the candidate leader with the lowest weighted delay is selected as the leader. In another example, each candidate leader is examined, and a list of candidate replicas is identified in the network. To select a leader and replicas from the candidates, the candidate leader having replicas with the lowest communication delay with the leader are identified. Of those replicas, M can be assigned as voting replicas. In yet another example, two heuristics using global information about the computing environment are used, and the best result from the heuristics is selected.

In some configurations, these processes can use an activity monitor that is capable of collecting measurements of the distributed computing system and provide metrics for use in the configuration and execution of applications running on the system. For example, in order to identify the leader as described above, the activity monitor can monitor and/or predict the activity of a client application. Based on this activity measure, an accurate or likely weighting can be used to correctly select a leader. The use of such an activity monitor can provide a more accurate result than, for example, local heuristic tests, the human intuition of network administrators, or random chance. In some cases, an administrator can adjust the weights of the workload in order to achieve a desired property or configuration. For example, the administrator may know that commit latency is of particular importance, the weighting can be adjusted to more heavily consider commits, for example.

FIG. 1 is block diagram of an example distributed computing environment 100 that can be used to support distributed databases. In general, distributed databases can store data in shards distributed among the computing clusters of the distributed computing environment 100 that are included in the distributed database. The distributed computing environment 100 is shown schematically with nodes representing computing clusters 102-120 and edges representing communication links between the computing clusters 102-120. An activity monitor 122 can monitor the distributed computing environment 100 (e.g., interactions between clients and the distributed database, communication delays between elements of the distributed computing environment) and provide metrics for use in the configuration and execution of applications running on the distributed computing environment 100. A task assigning service 124 can, possibly using information from the activity monitor 122, assign the computing clusters to various roles within a distributed database running on the distributed computing environment 100. In some configurations, the activity monitor 122 and/or the task assigning service 124 are software services that run on one or more of the computer clusters 102-120.

The computer cluster 102-120 represent computing clusters, network servers, datacenters, one or more computers, or other appropriate computing systems able to work together to generate the distributed computing environment 100 and to execute computing tasks such as running software applications, creating virtual machines, etc. The computing clusters 102-120 may be made of heterogeneous or homogenous computing hardware that includes computer readable memory, processors, and network infrastructure to facilitate communication within a cluster and between clusters 102-120.

The distributed computing environment 100 can also include and/or interact with any number of clients, with clients 126 and 128 shown here. The clients 126 and 128 may be computing systems that are communicably coupled to the distributed computing environment 100 and/or may be computing clusters of the distributed computing environment 100. In any case, the clients 126 and 128 may interact with distributed computing environment 100 to perform distributed computing operations. In this example, the clients 126 and 128 are two clients that are associated with the same distributed database operating on the distributed computing system 100. More or fewer clients can be associated with a distributed database, including a single client for a particular database. Further, the number and location of clients may change over time, with clients being added, moved, or removed.

The clients 126 and/or 128 may be elements of other computing system or application, and in some of those cases, the clients 126 and/or 128 may perform other, non-client related activities. For example, a web server (not shown) may serve webpages to many browsers (not shown) over the internet. To manage the content of this webpage, the web server may use a distributed database running on the computing environment 100. To access the distributed database, the web server may communicate with or serve as, for example, the client 126.

The client 126 and 128 perform workloads of requests to their associated distributed database. This workload include any technologically appropriate processes for interacting with a distributed database, including but not limited to reading, writing and deleting data; interpreting queries; etc. The activity monitor 122 can be configured to monitor the clients 126 and 128 in order to generate the workload data 130 and 132, which describes the interactions with the distributed database by the clients 126 and 128, respectively. The workload data 130 and 132 may take the form of, for example, logs of interactions with the distributed database, summary information such as counts of the types of interactions, classifications of the workload according to set of defined types of workloads, etc.

For each of the clients of distributed databases (e.g., one for client 126 and 128, and for other distributed databases not shown), the task assigning service can assign some of the computing clusters 102-120 to be replicas, voters, or a leader. These distributed databases need not include all of the computing clusters 102-120, and in some configurations may be associated with any technologically appropriate number of clients. For clarity, going forward, this document will discuss the selection and assignment of one distributed database associated with the clients 126 and 128. However, it should be understood that these sorts of selections and assignments can be done for many distributed databases, possibly contemporaneously.

As will be described below, one computer cluster 102-120 is selected and assigned to the leader role. After this, N other computer clusters 102-120 are selected and assigned to be replicas, and M computer clusters are selected and assigned to be voters.

In order to select the leader, the activity monitor 122 can access and/or generate the workload 130 and 132. The activity monitor 122 can then determine or predict the frequency of each process called by the clients 126 and 128. The task assigning service 124 may then use these frequencies to weight the delay of each computer cluster 102-120 in performing the operations for the clients 126 and 128 and select the computer cluster 102-120 with the lowest weighted delay as the leader.

In addition to the calculations discussed below, additional constraints may be placed on replica and role allocations. For example, a constraint defining a minimum of central processing unit (CPU) resources may be set so that a leader is able to handle the requirements of leading. In some cases, it may be desirable to consider latency for only a subset of operations (e.g., just writes). To do so, some operations may be excluded from consideration; additional weightings can be used for different operations or types of operations, etc.

FIG. 2 is spreadsheet 200 of example calculations used to determine communication delays. For example, the spreadsheet 200 may be calculated by, or may represent internal calculations performed by, the task assigning service 124 as it selects a computer cluster 102-120 to be a leader of a distributed database. For clarity, the data is shown for a single client 126 of the distributed database, but this data may be extended to more clients, including all clients of a distributed database.

Cells 202 show the delay associated with processes that can be called by the clients 126 and 128 to the computer clusters 102-120 (some rows are excluded for clarity). The processes 1-4 may represent any appropriate process such as a data read, write, copy, etc. In this example, if the client 126 calls Process 1 to computer cluster 106, the associated delay is shown as 28 milliseconds (ms). This 28 ms delay may be the delay between when the client 126 calls the process and when the process is completed, between call and receipt of confirmation by the client 126, or any other technologically appropriate measure. That is, the delay can include time for processing the process, time for network delay (including routing through other computer dusters) and other delays.

Cells 204 show a measured or predicted frequency of the processes that the client 126 will call or has called. In this example, the number represents the number of times per second that a process is called as measured or predicted for a sample window of one minutes. For example, in sample 2, the client 126 calls the Process 2 0.4 times per second. However, any technologically appropriate scheme to show relative frequencies may be used. For example, the frequencies may be normalized to add to a particular value (e.g., 1 or 100). In this example, Sample 1 is made as a naïve default that can be used when, for example, nothing is known about the client 126. In the Sample 1, each process is given the same value of 1, representing a default assumption that each process will be called the same number of times. In some configurations, different defaults may be used. For example, clients of a similar class to the client 126 may be examined and a probability distribution based on those similar client's recorded activity may be used Sample 2 and Sample 3, in this example, represent measured process calls made by the client 126.

Cells 206 show the total delay of all processes, weighted according to a sample. To find this total, for each computing cluster 102-120, the delay for each process is weighted according to the corresponding weight in the sample, and the aggregation of the weighted delays is found. The calculations for computing cluster 110 under the weighting of Sample 2 will be shown below, as way of an example:

Total delay=(Process 1 delay*Sample 2 Process 1 frequency)+(Process 2 delay*Sample 2 Process 2 frequency)+(Process 3 delay*Sample 2 Process 3 frequency)+(Process 4 delay*Sample 2 Process 4 frequency)

Total delay=(66*0.5)+(11*0.4)+(76*1.3)+(59*1.6)

Total delay=230.6

Other types of aggregations are possible. Other examples include a median, a maximum, or any type of aggregation operating for a subset of operations. Such a subset may be only stat-altering operations or only reads, for example.

As previously described, the calculations shown in the spreadsheet 200 can be used for identifying the computing cluster 102-120 that, for a given workload 130, would result in the minimum total delay. As such, the minimum total delays under Weight 1, 2, and 3 are shown in bold in the cells 206. As shown, the computer cluster 102-120 with the minimum total delays for Weight 1, 2, and 3 are computer clusters 114, 112, and 108, respectively. For purposes of clarity, the leader selection that follows will be described with respect to Sample 3, in which computer cluster 108 has the lowest weighted delay.

Figure 3:
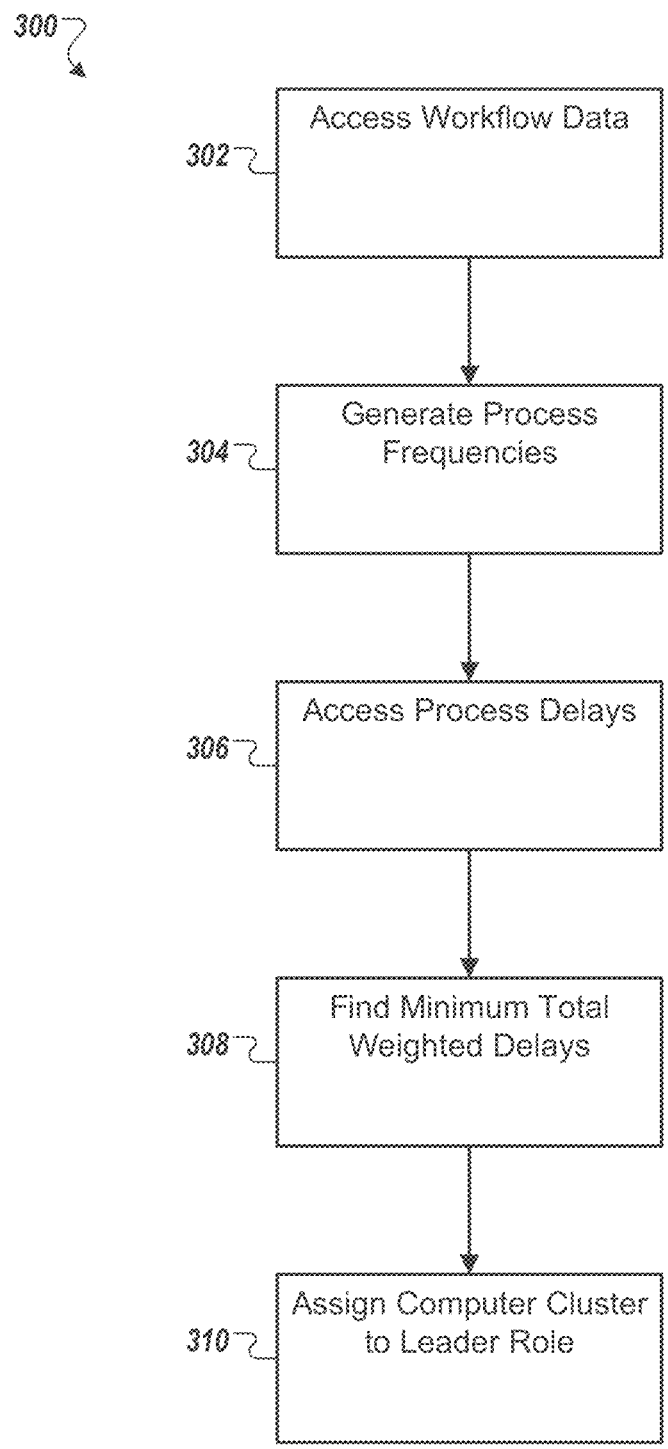
FIG. 3 is a flow chart of an example flow for selecting a leader for a distributed database.

FIG. 3 is a flow chart of an example flow 300 for selecting a leader for a distributed database. For clarity, the How 300 will be described with respect to the distributed computing environment 100 and the data related to Sample 3 in the spreadsheet 200. However, other systems and other data may be used to perform the flow 300 or a similar process.

The flow 300 can be performed by, for example, the activity monitor 122 and the task assigning service 124 in order to select a computing cluster 102-120 as a leader role of a distributed database used by the client 126. In general, this leader can be selected based on the expected delay required to perform the interactions identified in the workload 130. By accessing data about the distributed computing environment 110, the activity monitor is able to accurately identify the kinds of processes in the workload 130 and perform a leader selection more accurately than, for example, selections based off of incomplete and bias information.

Workload data is accessed 302. For example, the activity monitor 122 can generate the workload data 130 that describes the historical interactions between the client 126 and the distributed database. This workload data 130 may be analyzed to, for example, understand the kinds of interactions that the client 126 is likely to have with the distributed database based on the recent or past behavior of the client 126. In some cases, the activity monitor 122 can observe and log process calls made by the client 126 to the distributed database. In case historical records like the logs are not available (e.g., a new client joins or a new distributed database is created), the activity monitor can create predicted workload data. For example, if a client application has been used historically for a particular purpose, and the client 126 instantiates a new copy of the same client for the same purpose, the activity monitor 122 can use the old workload data from the other client and apply it to the client 126 for this purpose.

Process frequencies are generated 304. For example, the activity monitor 122 can parse the historical data for the workload 130 to identify instances of the client 126 calling a process of the distributed database, along with associated timestamps, parameters used, etc. The activity monitor 122 can then generate data representing the frequency with which the client 126 calls the each process. Example data of this type is shown in the cells 204 of the spreadsheet 200.

Process delays are accessed 306. For example, the activity monitor 122 can generate, or access from another service, information about the delay needed for computing clusters 102-120 to complete the processes of the distributed database. This delay may include, for example, network delay caused by the communication between the client 126 and the clusters 102-120 and the processing delay needed by the cluster to perform the requested process. In many cases, irregular network topologies, computing resources, and load differentials can result in each cluster 102-120 having delay values that are different than the delay values of other clusters. Example data of this type is shown in the cells 202 of the spreadsheet 200.

Minimum total weighted delays are found 308. For example, the activity monitor 122 can find, for each of the computing clusters 102-120 of the distributed computing environment 100, a total weighted delay. To find this delay, the activity monitor 122 can multiply each process' delay by the process' frequency, and sum these weighted delays. Example data of this type is shown in cells 206 of the spreadsheet 200.

A computing cluster is assigned to a leader role 310. For example, the activity monitor 122 can find the lowest total weighted delay and the task assigning service 124 can assign the associated computer cluster 102-120 to the leader role for the distrusted database. In the example of Sample 3 of the spreadsheet 200, this minimum total weighted delay is 63.3 ms, associated with computing cluster 108. As such, the task assigning service 124 can assign computing cluster 108 to the leader role.

Figure 4:
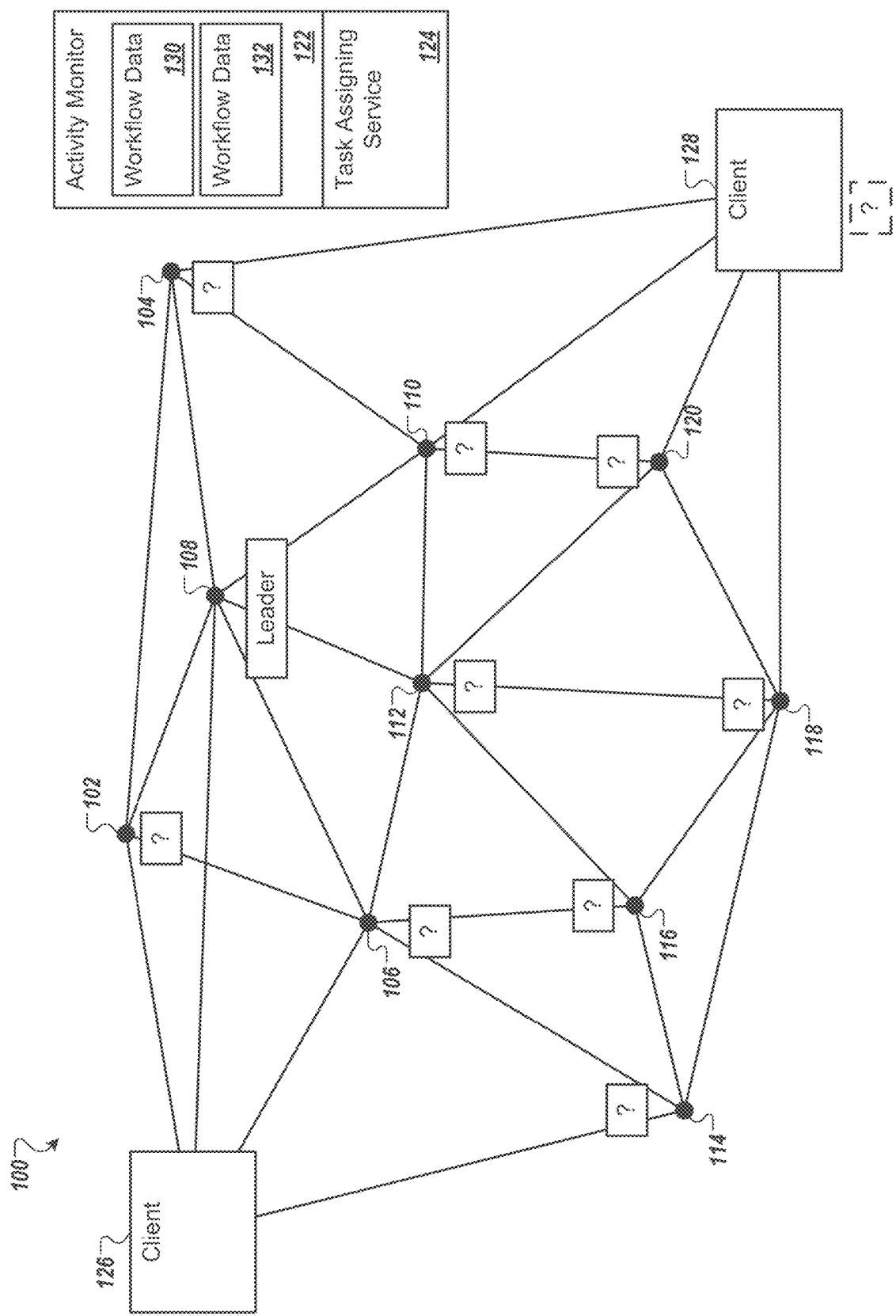
FIG. 4 is block diagram of an example distributed computing environment in which some computing clusters are candidates for replica and voting roles within a distributed database.

FIG. 4 is block diagram of the example distributed computing environment 100 in which some computing clusters are candidates for replica and voting roles within a distributed database. As shown, the computing cluster 108 has been assigned to the leader role for a distributed database running on the distributed computing environment 100. In this example, the leader role has been selected according to a process in which a minimum total weighted delay for a given workload is found. However, other processes for finding and assigning a leader could be used. For example, a human administrator could select the leader, a different metric could be created to find a leader, etc. Once some or all of the roles are selected, the distributed database can begin storing data of the distributed database in shards distributed among computing clusters 102-120.

In addition to having a leader role, the task assigning service 124 can assign other computing clusters 102-106, 110-120 to other roles in the distributed database. In this example, the distributed database will include five total replicas, with three of the replicas having a voting role. The leader in this example counts as a voting replica. In some cases, some computing clusters may host other clients (e.g., client 128) of other distributed database, the client of this distributed database may be running on one of the computing clusters, and/or the activity monitor 122 and/or the task assigning service 124 may be running on one or more of the computing clusters of the distributed computing environment 100.

With the leader selected, and having specified that the distributed database should have five replicas, three of which are voting, the activity monitor 122 and the task assigning service 124 can determine which of the other computing clusters 102-106; 110-120 are to be assigned to replica and voting roles. In this example, activity monitor 122 can find the communication round-trip time (RTT) between the leader computing cluster 108 and the other computing clusters 102-106; 110-120. Based on the RTTs, the task assigning service can assign, to the two computing clusters 102-106; 110-120 with the lowest RTTs, a voting role in the distributed database. The task assigning service can assign, to the two computing cluster 102-106; 110-120 with the next two lowest RTTs, a replica role within the distributed database. By doing both, the task assigning service 124 can thus assign a total of five replicas (two replica role, two voting role, one leader role) with three voting replicas (two voting role, one leader role).

Figure 5A:
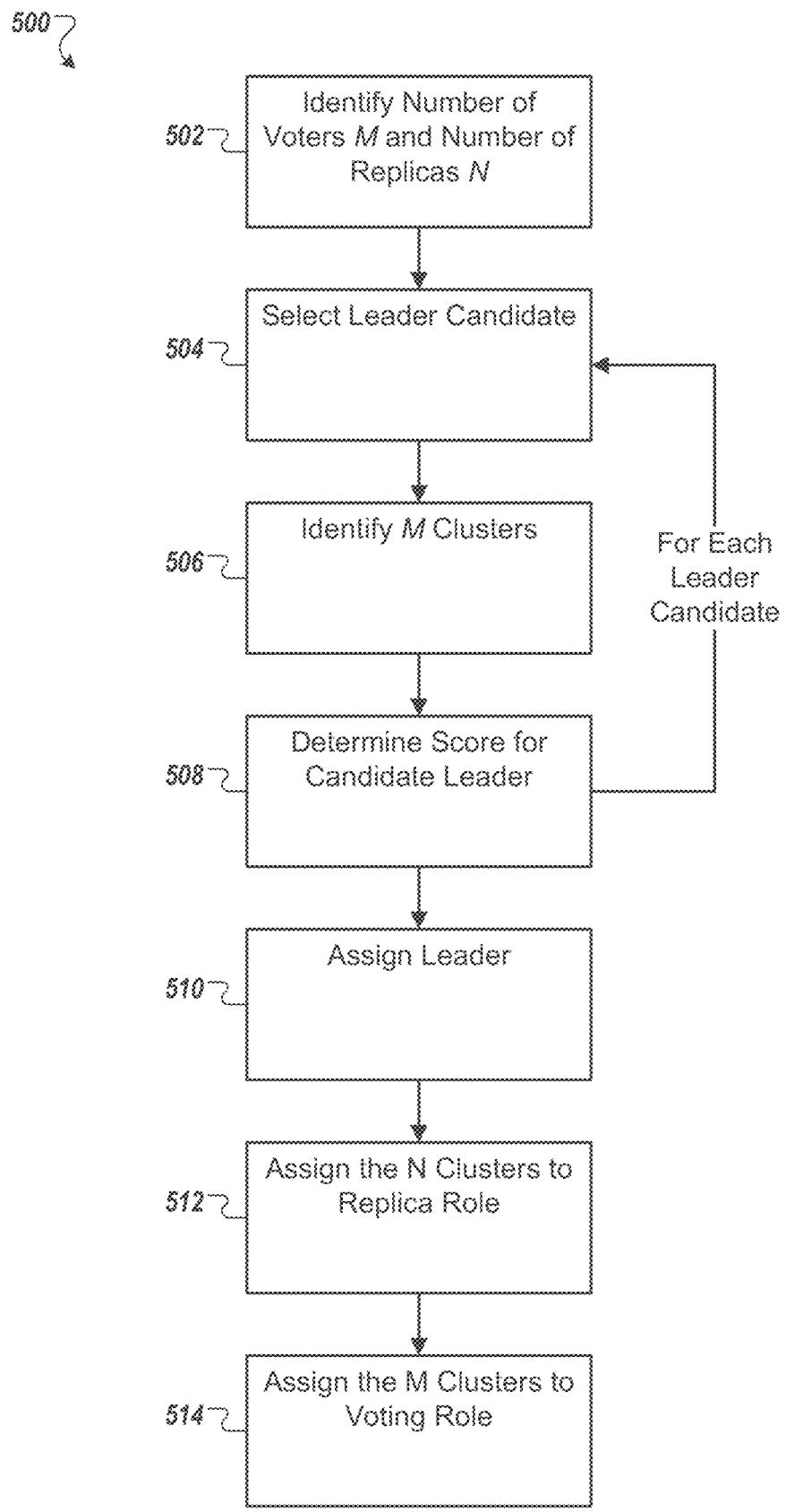
FIG. 5A is a flow chart of an example flow for selecting computing clusters for replica and voting roles within a distributed database.

FIG. 5A is a flow chart of an example flow 500 for selecting computing clusters for replica and voting roles within a distributed database. For clarity, the flow 500 will be described with respect to the distributed computing environment 100. However, other systems may be used to perform the flow 500 or a similar process.

The flow 500 can be performed by, for example, the activity monitor 122 and the task assigning service 124 in order to select computing clusters 102-120 as replica, and to assign leader and voting roles of a distributed database used by the clients 126 and 128. In general, each computing cluster 102-120 can be considered as a candidate leader. Then, replica and voting roles can be selected based on the expected RTT to communicate with the candidate leader. The candidate leader showing the best performance (e.g., minimum total RTT between the leader and every replica) can then be selected as the actual leader, with the corresponding replica and voting roles assigned. By accessing data about the distributed computing environment 110, the activity monitor is able to accurately identify the delays in the distributed computing environment 100 and perform role selection more accurately than, for example, selections based off of incomplete and bias information.

The number of voters (M) and number of replicas (N) are identified 502. For example, the client 126 can request to the distributed computing environment 100 to generate a distributed database. This request may include a request to have five replicas to provide redundancy in case one replica is down for maintenance and another replica fails or in case two replicas fail, three replicas will still be available. The request may further request to have three voting replicas.

With M and N specified, the task assigning service 124 may provisionally assign 504 to a candidate leader role to a computer cluster 102-120 of the distributed computing environment 100. For clarity, this example will consider computing cluster 108 as a candidate leader. This provisional assignment may be based on, for example, random or ordered selection, the delay associated with completing processes in the workload 130; based on a heuristic looking at the client 126 and or the distributed computing environment 100; a user selection; or any other technologically appropriate process.

M clusters are identified 506. For example, the activity monitor 122 can track activity within the distributed computing environment 100, including but not limited to tracking the RTTs between the computing clusters 102-120 and other metrics. For example, the activity monitor can identify the leader that minimized operational latency with other replicas using equation 550 of FIG. 5B. In the equation 550, $\lambda^{(i)}_{db}$ is the candidate leader, $score^{(i)}(l)$ is equal to equation 551. Using these calculations, the activity monitor 122 can then identify the M computing clusters 102-106; 110-120 associated with the best score using equation 550. In this example, M is two, and the computing clusters 102 and 110 are the M are identified.

The score for the candidate leader is determined 508. For example, the activity monitor can score the leader according to a metric used to identify the quality of the candidate leader, compared to other candidate leaders. One example calculation could be the total RTT between the candidate leader and each of the M clusters. Another example calculation could be finding the k-th smallest RTT between the candidate leader and other replicas, where k=[(num_voters+ 1)/2].

The steps 504-508 are then repeated for each possible candidate leader. This pool of candidate leaders may include all of the computing clusters 102-120, or some of the computing clusters 102-120 may be excluded. For example, some of the computing clusters 102-120 may be excluded if they do not have sufficient computing resources, are located in an undesirable geographic location, etc. Once completed for each candidate leader, the candidate leader associated with the most preferable overall configuration is selected. For example, the most preferable may be the candidate having the lowest score according to the metric used to identity the quality of the candidate leader previously discussed.

The M clusters are assigned to a voting role 506. With the M computing clusters 102 and 110 identified, the task assigning service 124 can assign to the M computing clusters 102 and 110 a voting role for the distributed database requested by the client 126.

N clusters are assigned to a replica role 510. The activity monitor 122 and/or the assigning service 124 may select N computing clusters to be assigned to a replica role (e.g., a replica that is not a voter) according to any technologically appropriate process. For example, the task assigning service 124 may assign replica roles near clients, to computing clusters 102-120 with low operating costs, to computing clusters 102-120 in preferred jurisdictions, or based on geographic concerns. In this example, the task assigning service 124 can assign the N computing clusters 106 and 112 a replica role for the distributed database requested by the client 126.

The flow 500 have been described to select for best results on the expected latency. In another example, a selected configuration may be one that reduces tail latency.

When considering tail latency, linear properties may not provide useful metrics. Instead, an alternative score calculation is shown in equations 552 in FIG. 5B. As input, instead of the average roundtrip-time latencies, the roundtrip-time latency distribution $H_{a,b}$ between each pair of locations a and b is used. In other words, $H_{a,b}$ is based on the round trip time between each communication link between each computing cluster. For clarity, it will be assumed that these distributions are independent and that the latencies are discretized as multiples of 1 ms.

When computing the latency for each operation type, instead of summing averages, the distributions of the sum of the random variables is computed. As an example, consider a simple case of a bounded read, which travels from a client c to the closest replica nearest(c,R), then from nearest(c,R) to the leader l and back all the way to the client. In order to find the latency distribution of this operation, a discrete convolution $H_{c,nearest(c,r)}*H_{nearest(c,R),l}$ is performed, as shown in the equations 552. In the equation 552, m denotes the minimum possible value of $t^{(i)}_{bounded\ read,\ c}(l)$ and rtt is the random variable corresponding to the latency (rather than the average latency). Once the distribution of the sum has been computed, the required percentile can be taken from the distribution. This required percentile may be a user selected input, or received from a different source. For example, a database administrator may be interested to minimize the 99% latency, and would thus supply 99% as the required percentile.

In this implementation, a quorum latency is determined as a variable. A quorum latency is the latency for a quorum of voters to approve a vote after the vote is submitted to the quorum. One process of computing a quorum latency is to compute a distribution of quorum latencies. This involves selecting multiple different quorums from a group and computing a latency for each selected quorum. One numeric method to do this is to perform a Monte Carlo simulation, repeatedly sampling the distributions $H_{l,v}$ for $v \in V$ and computing the median latency for each time. For an analytical solution, observe that the leader needs to collect majority-1 responses from the other servers, where majority←[(|V|+1)/2] and assume that the leader's own response arrives faster than any other response. The cumulative distribution function (CDF) of the maximum response time for any set of read-write replicas is simply the product of the CDFs of response time for the individual replicas. For example, for 3 read-write replicas l, v and w where l is the candidate leader, see equation 554. In other words, the CDF of the maximum is the probability that the maximum is less than x for different values of $\lambda$. The maximum of events a and b is less than x when both a and b are less than x. If events a and b are independent, then the probability that both a and b are less than x is equal to the probability that a is less than x multiplied by the probability that b is less than x.

Therefore, the CDF of the maximum response time can be calculated for every subset of read-write replicas can be constructed. From these, using the inclusion-exclusion principal, the probability of the event that at least one subset of the read-write replicas, of cardinality majority-1, has maximum response latency less than x can be computed, for each x. This event is equivalent to the event that the quorum's response time is less than x, hence it gives the CDF of the quorum response time. Continuing the example of 3 read-write replicas, the equation 556 is provided. In other words, the equation 556 applies the principal that a union of two sets A and B is A+B-their intersections. The intersection may be removed, for example, to avoid double counting the members of the intersection.

Figure 6:
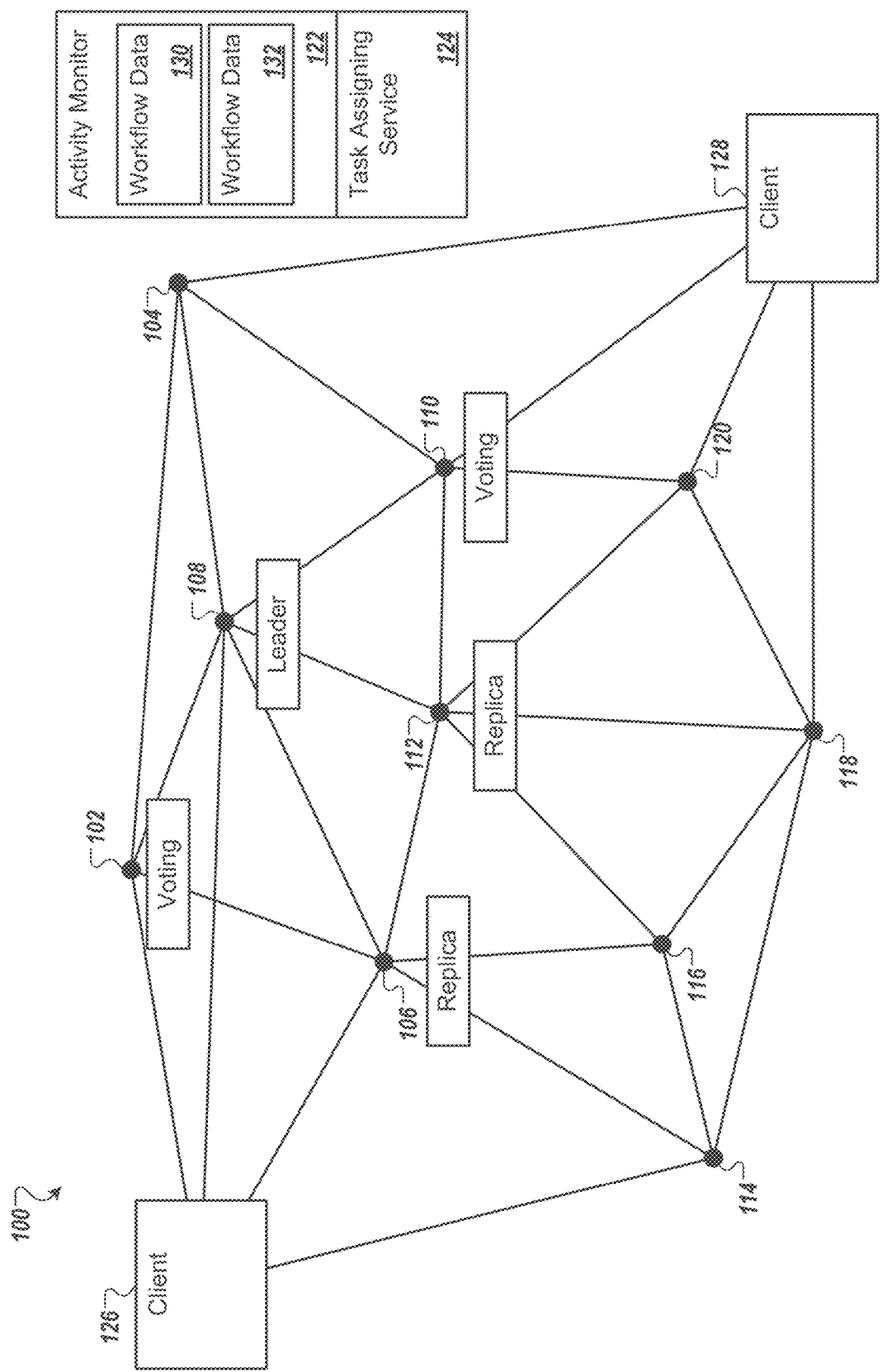
FIG. 6 is a block diagram of an example distributed computing environment in which some computing clusters are selected for replica and voting roles within a distributed database.

FIG. 6 is a block diagram of the distributed computing environment 100 in which some computing clusters 102-120 are selected for replica and voting roles within a distributed database. In this example, the activity monitor 122 and the task assigning service 124 have used the flow 500 to assign the computing cluster 108 to a leader role in the distributed database, the computer clusters 102 and 110 to a voting role in the distributed database and assign the computer clusters 106 and 112 to a replica role in the distributed database.

With these roles assigned to the clusters 102-112, the client 126 may interact with the distributed database, for example, to store, manipulate, and access data. In addition, the client 128 and other clients may use the distributed computing environment 100 to run other distributed databases and to run other software and services. In many cases, the overall usage of the distributed computing environment 100 can change over time. This change may be periodic or cyclical.

For example, the distributed computing environment 100 may physically span the Earth. As different population centers around the Earth transition from day to night, their usage of the distributed computing environment 100 can change. For example, many clients are most active during the work day and are less active at night and on weekends. Other cyclical changes can occur on different time frames. For example, e-commerce and accounting system may have heavier usage at year end, which are heavy holiday shopping and account closing times in many countries. Similarly, systemic changes can be made to the distributed computing environment 100. New clients can come online, old clients removed, resources can be added to or removed from existing computing clusters 102-120, computing clusters can be added and removed, network communication links changed, etc.

All of these changes can result in changing performance by the distributed computing environment 100. To account for these changes, the processes described here, in which roles of a distributed database are assigned to computing clusters of the distributed computing environment 100, may be repeated. This may result in some or all of the roles reassigned to different computing clusters.

Figure 7:
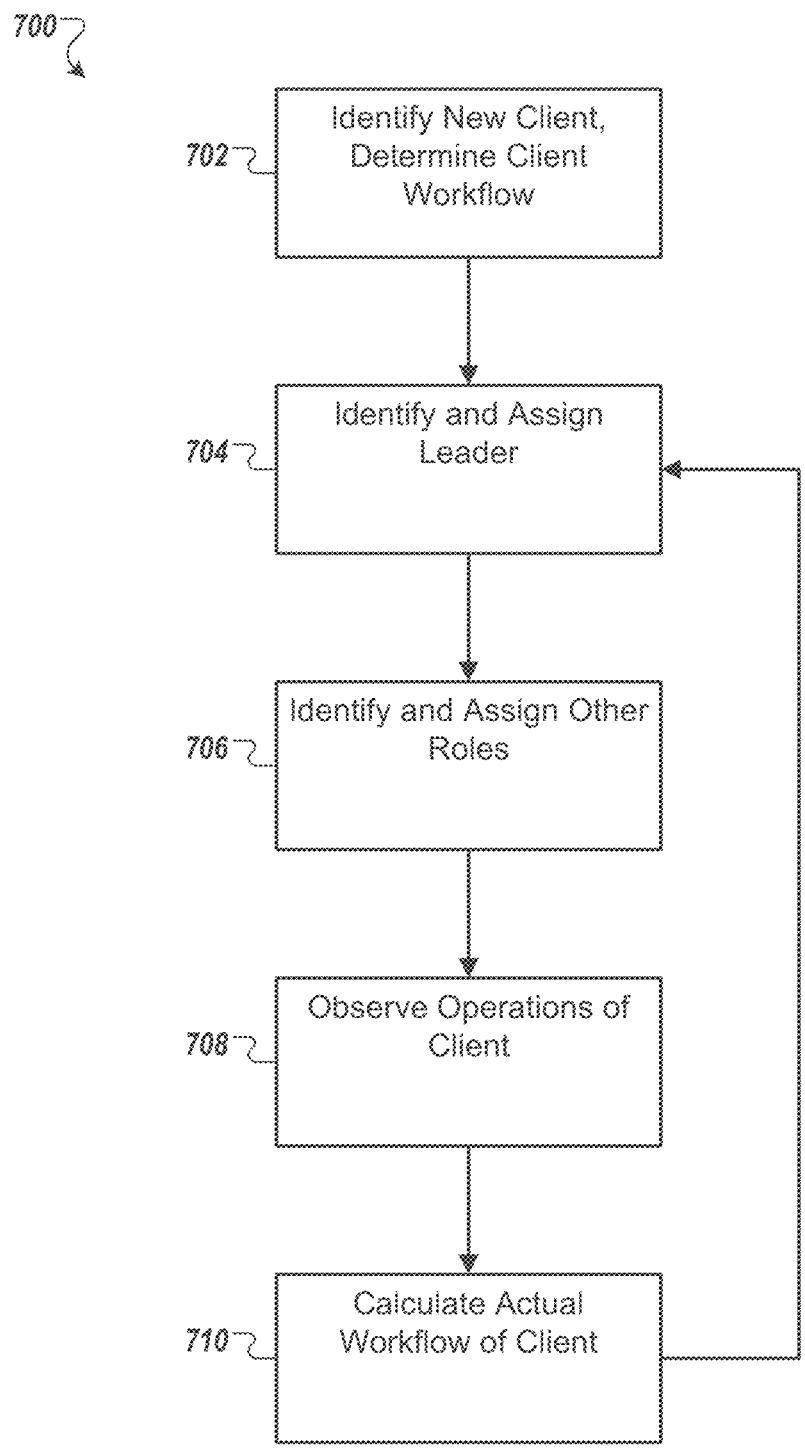
FIG. 7 is a flow chart of an example flow for periodically selecting computing clusters for roles in a distributed database.

FIG. 7 is a flow chart of an example flow 700 for periodically selecting computing clusters for roles in a distributed database. For clarity, the flow 700 will be described with respect to the distributed computing environment 100. However, other systems may be used to perform the flow 700 or a similar process.

The flow 700 can be performed by, for example, the activity monitor 122 and the task assigning service 124 in order to select computing clusters 102-120 as leader, replica, and voting roles of a distributed database used by the client 126. Once the roles are selected and the activity monitor 122 can generate accurate workload data for the client 126 and to take advantage of periodic or system changes to the distributed computing environment 100, portions of the flow 700 can be repeated to reassign the roles of the distributed database.

A new client is identified, and the new client's workload is determined 702. For example, the client 126 can request a new distributed database be created on the distributed computing environment 100. The activity monitor 122 can generate data to predict the type of workload 130 that the client 126 will produce. In some cases, the activity monitor may use heuristics. Information about the client 126, the users of the client 126, and other data may be used to formulate a predicted workload. In some cases, the activity monitor 122 can identify a client similar to the client 126 and use the similar client's workload in place of the client 126's workload 130. For example, if the client 126 is an off-the-shelf e-commerce application, the activity monitor 122 can use historical workload data from other instances of the same e-commerce application to predict the workload of the client 126.

A leader is identified and assigned 704. For example, the activity monitor 122 and/or the task assigning service 124 can use the flow 300, or any other process, to identify and select one of the computing clusters 102-120 as the leader for the distributed database.

Other roles are identified and assigned 706. For example, the activity monitor 122 and/or the task assigning service 124 can use the flow 500, or any other process, to identify and select one or more of the computing clusters 102-120 as, for example, voters and replicas for the distributed database.

Operations of the client are observed 708 and actual workload for the client is calculated 710. For example, as the client operates, the activity monitor 122 can track the activity of the client 126, or receive data from another system tracking the activity of the client 126. From this, the activity monitor can generate data reflecting the actual workload 130.

The flow 704-710 can be repeated. These may be repeated according to one or more scheduled, and/or for one or more reasons.

One reason for repeating the flow 704-710 is to reassign roles that were assigned using predicted, instead of historical, information about the workload 130. For example, after assigning the roles based on the predicted workload for the client 126, the task assigning service 124 can later reassign those roles based on the real workload 130 that has been observed.

Another reason for repeating the flow 704-710 is to reassign roles after one or more systemic changes to the client 126 and/or the distributed computing network 100. For example, the client 126 may be part of the back-end of a webpage that receives a large increase is user traffic. This may result in a change to the workload 130, and thus there may be a configuration of roles that could increase the efficiency of the distributed database. In another example, new network infrastructure may change the communication delay between some of the computer clusters 102-120, and thus there may be a configuration of roles that could increase the efficiency of the distributed database.

Another reason for repeating the flow 704-710 is to reassign roles to take advantage of periodic changes to the distributed computing system's 100 workload. For example, during the day local to the client, one configuration of roles may be most efficient, but at night local to the client, a different configuration of roles may be more efficient. By timing the repetition property (e.g., every 12 hours, monthly, quarterly), these changes may be taken advantage of.

In addition to, or in the alternative to, using the previously described processes for selecting replicas and assigning roles to the replicas, there are other processes for selecting replicas and assigning roles to the replicas. As will be described, these processes may be used together, or only one or some of the processes may be used.

Described now will be a process by which two operations are used to select the best set of replicas R from possible locations S, a set of voters V ⊆ R (that is, the voters are a subset or equal to the set of replicas), and the best leader from V. By use of these operations, large savings in computational time may be realized. For example, some brute force search methods may require hours or days to compute, while this process may compute within minutes or seconds.

Figure 8A:
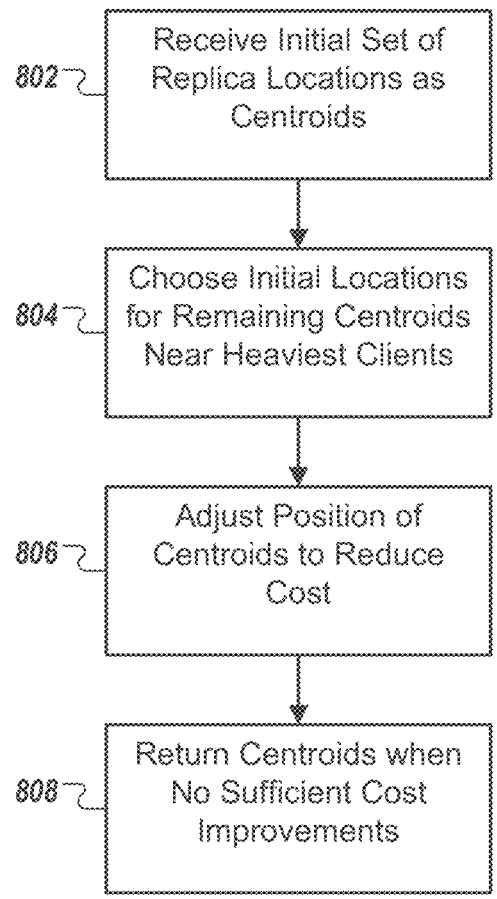
FIG. 8A is a flowchart of example flow that may be used to identify replica locations and roles.

FIG. 8A is a flowchart of example flow 800 that may be used to identify replica locations and roles. For clarity, the flow 800 will be described with respect to the distributed computing environment 100. However, other systems may be used to perform the flow 800 or a similar process.

The flow 800 can be performed by, for example, the activity monitor 122 and the task assigning service 124 in order to select computing clusters 102-120 as replicas. In general, a few computing dusters 102-120 are assigned as replicas and treated as centroids. Additional centroids are identified near clients with heavy usage, and then the replica locations are refined.

An initial set of replica location are received 802 as centroids. For example, the activity monitor 122 and the task assigning service 124 may select one, two, or three of the computing clusters 102-120 as centroids.

Initial locations for remaining centroids are chosen 804 for the remaining centroids. For example, the activity monitor 122 can identify the clients 126 and 128 with the heaviest workload based on the workload data 130 and 132 and the task assigning service 124 can assign the nearest computing clusters 102-120 as centroids.

The position of centroids are adjusted 806 to reduce cost. For example, the activity monitor 122 and the task assigning service 124 can change the selected centroids.

The selected centroids are returned 808. For example, when an end condition is met (e.g. lack of sufficient cost improvements per change), the task assigning service 124 can set the centroids as replicas.

FIG. 8B is an example of pseudocode 850 that may be used to implement the flow 800. For clarity, the pseudocode 850 will be described with respect to the distributed environment 100. However, other systems may be used to perform the pseudocode 850 or a similar process.

The pseudocode 850 can be performed by, for example, the activity monitor 122 and the task assigning service 124 in order to select computing clusters 102-120 as replicas. In general, groups of the computing clusters 102-120 around each client are iteratively identified until a final set of replicas are identified. Then, based on the selection of those replicas, voting and leader roles are assigned.

The flow 500 uses a variant of a weighted K-Means. The flow 500 assigns a weight $w_c$ to each client c (e.g., clients 126 and 128) based on the total number of operations performed by c. In some examples, the value for $w_c$ may be calculated with the formula 900 shown in FIG. 9. As part of the operation of the pseudocode 850, the pseudocode 850 can be configured to find a minimum value for cost(G), according to the formula 902.

The pseudocode 850 received an initial set of replica locations, called centroids $L_{fixed}$, selected from the computing clusters 102-120. Additionally, the pseudocode 850 receives a value num_replicas that specifies the number of desired replica location. The task assigning service 124 chooses initial locations for the remaining centroids (lines 6-10) by placing them close to the "heaviest" client according to $w_c$. Each centroid location g defines a set of client clusters $C_g$ for which g is the nearest centroid (line 15). The remainder of the pseudocode 850 adjusts the position of each centroid g in a way that minimizes cost (weighted roundtrip-time) for clients in $C_g$. The centroids $L_{fixed}$ may be set and not moved. The process can complete returning the set of centroids G once there is no sufficient improvement in the total cost (i.e. formula 902).

Figure 10A:
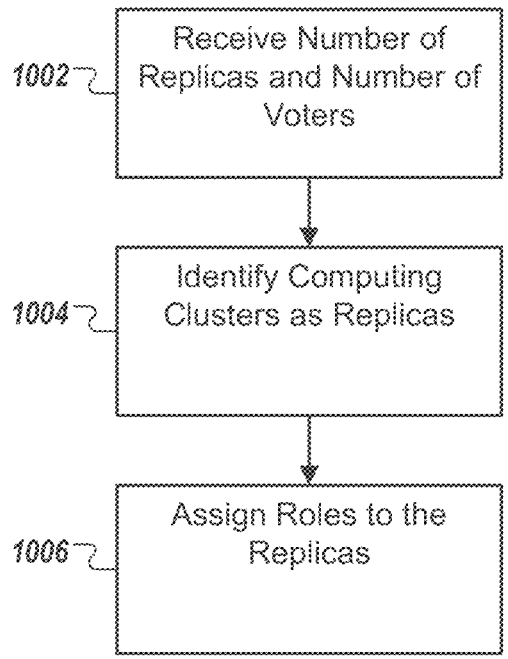
FIG. 10A is a flowchart of example flow that may be used to identify replica locations and roles.

FIG. 10A is a flowchart of example flow 1000 that may be used to identify replica locations and roles. For clarity, the flow 1000 will be described with respect to the distributed computing environment 100. However, other systems may be used to perform the flow 1000 or a similar process.

The flow 1000 can be performed by, for example, the activity monitor 122 and the task assigning service 124 in order to select computing clusters 102-120 as replicas. In general, replica locations are found, and then roles are assigned.

A number of replicas and a number of voters is received 1002. For example, a new distributed database may be set up in the computing environment 100. As pan of this set, an administrator may select the number of replicas and number of voters to be included in the distributed database.

Computing clusters are identified 1004 as replicas. For example, the activity monitor 122 and the task assigning service 124 may select the appropriate number of the computing clusters 102-120 as replicas.

Roles are assigned 1006 to replicas. For example, the activity monitor 122 and the task assigning service 124 may assign, to the replicas, roles in the distributed database.

FIG. 10B is an example of pseudocode 1050 that may be used to implement the flow 1000. For clarity, the pseudocode 1050 will be described with respect to the distributed environment 100. However, other systems may be used to perform the pseudocode 1050 or a similar process.

The pseudocode 1050 can be performed by, for example the activity monitor 122 and the task assigning service 124 in order to select computing clusters 102-120 as replicas and then to assign roles to the selected computing clusters 102-120. In general, the pseudocode 1050 may be called "KQ" because it first uses a weighted K-Means operations to find replica location, then if finds a Q quorum. By way of comparison, the pseudocode 1150, described below, may be called "QK" because if first finds a Q quorum then uses K-Means to find replica locations.

The pseudocode 1050 can receive num_replicas and num_voters (e.g., N and M as described above) as input values that specify the number of replicas and voters, respectively, which the distributed database should have. These values may often be configured based on the design goals or usage of the distributed database. For example, a num_voters of 7 and a quorum of 4 may be selected for a computing environment 100 that has never experienced more than 3 computing clusters 102-120 being unavailable at once.

The num_replicas and num_voters received, the activity monitor 122 and the task assigning service 124 can perform the pseudocode 850 in order to identify the G replicas of the computing clusters 102-120. Next, the activity monitor 122 and the task assigning service 124 can perform the flow 500 to assign roles, to the G computing clusters 102-120. The pseudocode 1050 can then return the leader, set of voters, and set of replicas.

Figure 11A:
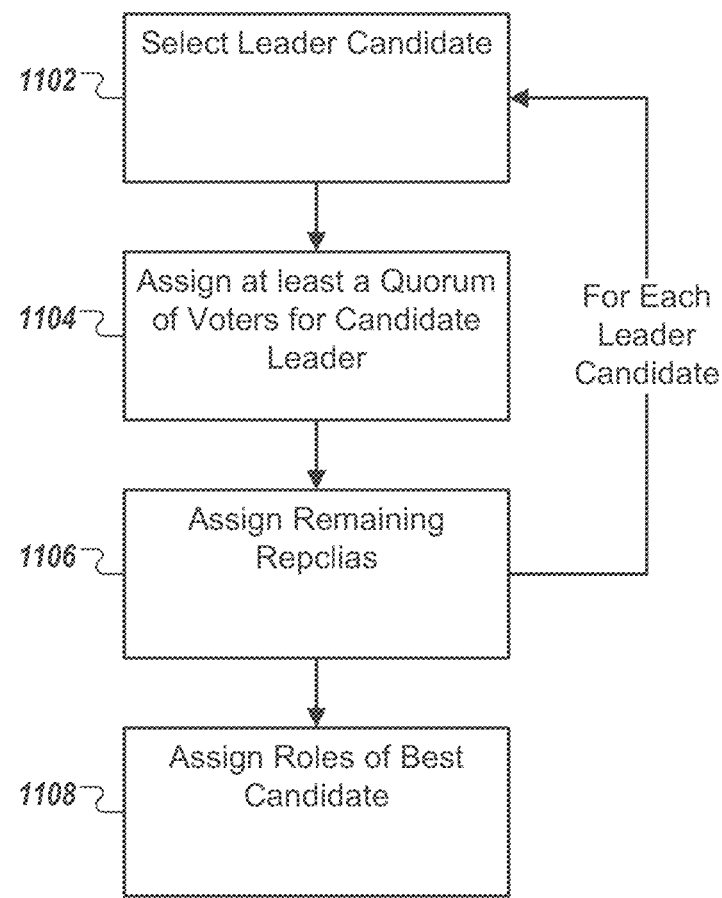
FIG. 11A is a flowchart of example flow that may be used to identify replica locations and roles.

FIG. 11A is a flowchart of example flow that may be used to identify replica locations and roles. For clarity, the flow 1100 will be described with respect to the distributed computing environment 100. However, other systems may be used to perform the flow 1100 or a similar process.

The flow 1100 can be performed by, for example, the activity monitor 122 and the task assigning service 124 in order to select computing clusters 102-120 as replicas. In general, for each leader candidate, a leader and a quorum of voters are placed, then the remaining replicas are placed near clients.

A leader candidate is selected 1102. For example, a new distributed database may be set up in the computing environment 100. To find the computing clusters 102-104, the task assigning service 124 can select a candidate computing cluster 102-120 as a candidate leader.

At least a quorum of voters are assigned 1104. For example, the task assigning service 124 can select a number of computing clusters 102-120 nearest the leader and assign these computing clusters 102-120 as voters.

The remaining replicas are assigned 1106. For example, the task assigning service 124 can assign additional computing clusters 102-120 near clients 126 and 128 as voters or replicas.

The flow 1102-1106 are repeated for each candidate leader, and for the best candidate leader, the roles are assigned 1108. For example, the task assigning service may find the candidate leader with the best overall configuration, and assign the roles associated with that candidate leader.

FIG. 11B is an example of pseudocode that may be used to implement the flow 1100 shown in FIG. 11A. For clarity, the pseudocode 1150 will be described with respect to the distributed environment 1100. However, other systems may be used to perform the pseudocode 1150 or a similar process.

The pseudocode 1150 can be performed by, for example the activity monitor 122 and the task assigning service 124 in order to select a leader, voters, and replicas from the computing clusters 102-120. As previously identified, the process may be referred to as "QK" because if first finds a Q quorum then uses K-Means to find replica locations.

The pseudocode 1150 first sets the leader and a quorum of voters and then places the remaining replicas close to the clients. More specifically, each possible leader location in S is considered to find the best quorum for this leader. The quorum is then considered as centroids that are 'pinned' and not moved.

Figure 12:
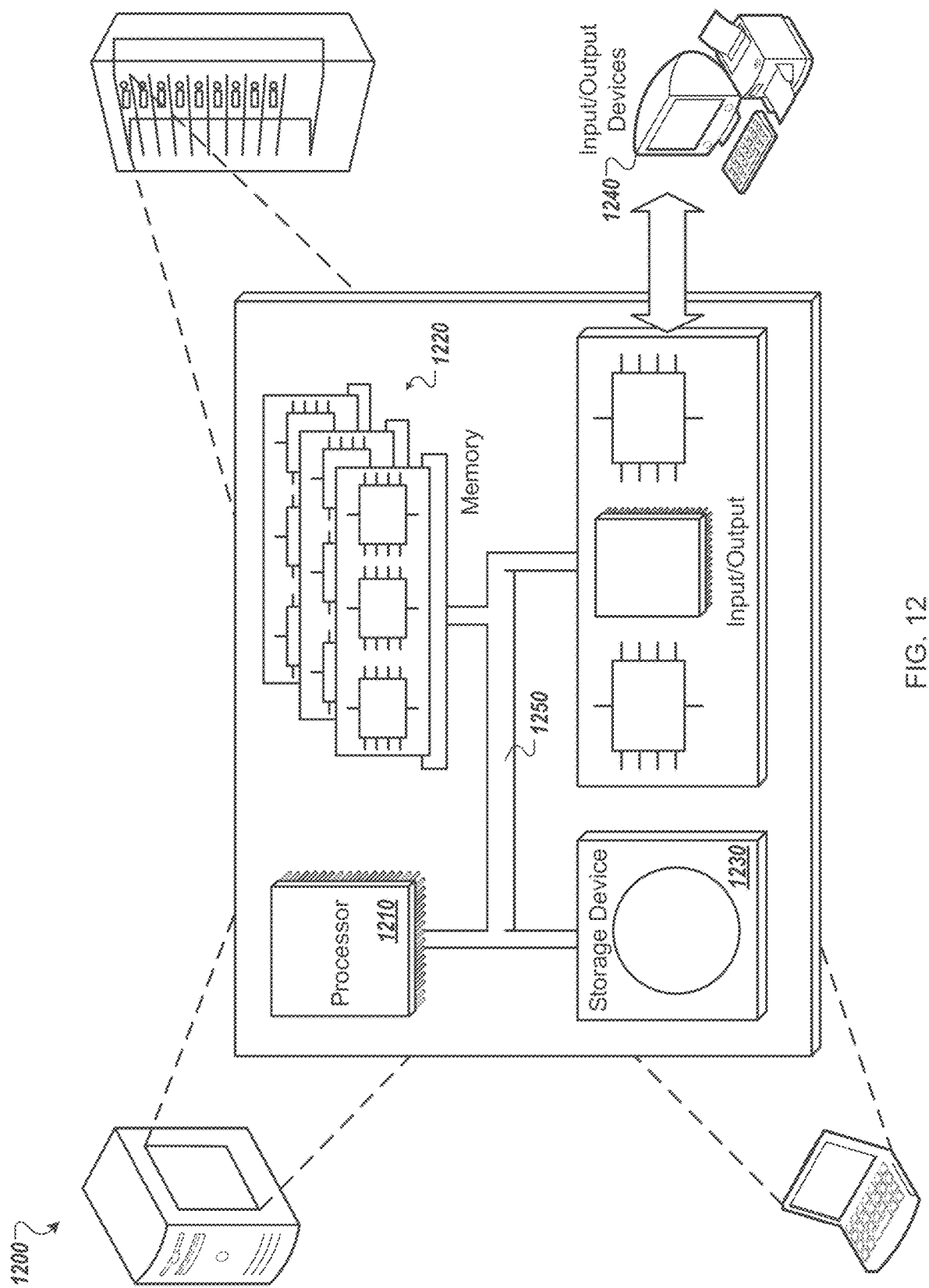
FIG. 12 is a schematic diagram that shows an example of a computing system.

FIG. 12 is a schematic diagram that shows an example of a computing system 1200. The computing system 1200 can be used for some or all of the operations described previously, according to some implementations. The computing system 1200 includes a processor 1210, a memory 1220, a storage device 1230, and an input/output device 1240. Each of the processor 1210, the memory 1220, the storage device 1230, and the input/output device 1240 are interconnected using a system bus 1250. The processor 1210 is capable of processing instructions for execution within the computing system 1200. In some implementations, the processor 1210 is a single-threaded processor. In some implementations, the processor 1210 is a multi-threaded processor. The processor 1210 is capable of processing instructions stored in the memory 1220 or on the storage device 1230 to display graphical information for a user interface on the input/output device 1240.

The memory 1220 stores information within the computing system 1200. In some implementations, the memory 1220 is a computer-readable medium. In some implementations, the memory 1220 is a volatile memory unit. In some implementations, the memory 1220 is a non-volatile memory unit.

The storage device 1230 is capable of providing mass storage for the computing system 1200. In some implementations, the storage device 1230 is a computer-readable medium. In various different implementations, the storage device 1230 may be a floppy disk device, a hard disk device, an optical disk device, or a tape device.

The input/output device 1240 provides input/output operations for the computing system 1200. In some implementations, the input/output device 1240 includes a keyboard and/or pointing device. In some implementations, the input/output device 1240 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks, and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system comprising:
a plurality of computing clusters each comprising computer memory and a computer processor;
a distributed database running on one or more of the plurality of the computing clusters and that interacts with a client application running on a client computer, the distributed database configured to:
store data of the distributed database in shards distributed among computing clusters of the distributed database; and
scale the one or more of the plurality of computing clusters that interact with the client application running on the client computer based on a delay threshold;
an activity monitor service configured to:
monitor interactions between the client application and the distributed database; and
generate, from the monitoring of the interactions between the client application and the distributed database, workload data describing the interactions between the client application and the distributed database; and
determine, for each respective computing cluster of the plurality of computing clusters, using the workload data, a delay in performing a particular operation for the client application from among a plurality of operations available to each respective computing cluster; and
a task assigning service configured to:
determine that the workload data satisfies the delay threshold corresponding to the delay of each computing cluster of the plurality of computing clusters in performing the particular operation for the client application; and in response to determining that the workload data satisfies the delay threshold corresponding to the delay of each computing cluster of the plurality of computing clusters in performing the particular operation for the client application, assign a particular subset computing of the plurality of computing clusters a replica role in the distributed database that allows the particular subset of the computing clusters to provide redundancy to satisfy a redundancy request from a client associated with the client application.

2. The system of claim 1, wherein the task assigning service is further configured to assign, based on the workload data, a second computing cluster to a leader role in the distributed database, wherein assigning the second computing cluster to a leader role comprises identifying a respective computing cluster having a lowest delay in performing the particular operation for the client application.

3. The system of claim 2, wherein to identify the respective cluster having the lowest delay in performing the particular operation for the client application, the task assigning service is configured to:
identify a frequency for the particular operation;
identify a delay value of the particular operation for each respective computing cluster; and
find, for each respective computing cluster, a weighted delay value that incorporates the frequency of the particular operation.

4. The system of claim 2, wherein the lowest delay corresponds to a tail delay based on a delay distributed between two or more computing clusters of the plurality of computing clusters, the delay distribution defined by a round-trip time between the two or more computing clusters of the plurality of computing clusters.

5. The system of claim 1, wherein generating, from the monitoring of the interactions between the client application and the distributed database, the workload data describing the interactions between the client application and the distributed database comprises:
receiving historical data comprising historical interactions between the client and the distributed database; and
generating predicted workload data describing the interactions between the client application and the distributed database based on the received historical data.

6. The system of claim 1, wherein the plurality of computing clusters execute computing tasks configured to create virtual machines.

7. The system of claim 1, wherein assigning the particular subset of the plurality of computing clusters the replica role in the distributed database occurs subsequent to the task assigning service assigning a second computing cluster to a leader role in the distributed database.

8. The system of claim 1, wherein the activity monitor service and the task assigning service are running on one or more of the computing clusters.

9. The system of claim 1, wherein one of the computing clusters of the plurality of computing clusters comprises the client computer.

10. A method comprising:
monitoring interactions between a client application and a distributed database, wherein the distributed database runs on at least one or more of computing clusters and interacts with a client application running on a client computer, wherein each computing cluster comprises computer memory and a computer processor, wherein the distributed database is configured to store data of the distributed database in shards distributed among computing clusters of the distributed database and scale the one or more of the plurality of computing clusters that interact with the client application running on the client computer based on a delay threshold;

generating, from the monitoring of the interactions between the client application and the distributed database, workload data describing the interactions between the client application and the distributed database;

determining, for each respective computing cluster of the plurality of computing clusters, using the workload data, a delay in performing a particular operation for the client application from among a plurality of operations available to each respective computing cluster;

determining that the workload data satisfies the delay threshold corresponding to the delay of each computing cluster of the plurality of computing clusters in performing the particular operation for the client application; and in response to determining that the workload data satisfies the delay threshold corresponding to the delay of each computing cluster of the plurality of computing clusters in performing the particular operation for the client application, assigning a particular subset of the plurality of computing clusters a replica role in the distributed database that allows the particular subset of the plurality of computing clusters to provide redundancy to satisfy a redundancy request from a client associated with the client application.

11. The method of claim 10, further comprising:
determining a respective computing cluster having a lowest delay in performing the particular for the client application; and assigning, based on the determination of the respective computing cluster having the lowest delay in performing the particular operation for the client application, a second computing cluster to a leader role in the distributed database.

12. The method of claim 11, wherein determining the respective computing cluster having the lowest delay in performing the particular operation for the client application comprises:

identifying a frequency for the particular operation;

identifying a delay value of the particular operation for each respective computing cluster; and finding, for each respective computing cluster, a weighted delay value that incorporates the frequency of the particular operation.

13. The method of claim 11, wherein the lowest delay corresponds to a tail delay based on a delay distributed between two or more computing clusters of the plurality of computing clusters, the delay distribution defined by a round-trip time between the two or more computing clusters of the plurality of computing clusters.

14. The method of claim 10, wherein generating, from the monitoring of the interactions between the client application and the distributed database, the workload data describing the interactions between the client application and the distributed database comprises:

receiving historical data comprising historical interactions between the client and the distributed database; and generating predicted workload data describing the interactions between the client application and the distributed database based on the received historical data.

15. The method of claim 10, wherein the plurality of computing clusters execute computing tasks configured to create virtual machines.

16. The method of claim 10, wherein assigning the particular subset of the plurality of computing clusters the replica role in the distributed database occurs subsequent to a task assigning service assigning a second computing cluster to a leader role in the distributed database.

17. The method of claim 10, wherein generating the workload data describing the interactions between the client application and the distributed database occurs at an activity monitor service and wherein determining that the workload data satisfies the delay threshold corresponding to the delay of each computing cluster of the plurality of computing clusters in performing the particular operation for the client application occurs at a task assigning service, and wherein the activity monitor service and the task assigning service are executing on one or more of the computing clusters.

18. The method of claim 10, wherein one of the computing clusters of the plurality of computing clusters comprises the client computer.

* * * * *